(12) United States Patent
Jacobsen

(10) Patent No.: US 9,188,411 B2
(45) Date of Patent: Nov. 17, 2015

(54) ON-BOARD PASSIVE PROTECTION DEVICE

(71) Applicant: Airbus Operations GmbH, Hamburg (DE)

(72) Inventor: Soenke Jacobsen, Koelln-Reisiek (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 235 days.

(21) Appl. No.: 13/919,535

(22) Filed: Jun. 17, 2013

(65) Prior Publication Data

US 2013/0333550 A1    Dec. 19, 2013

Related U.S. Application Data

(60) Provisional application No. 61/660,952, filed on Jun. 18, 2012.

(30) Foreign Application Priority Data

Jun. 18, 2012  (EP) ..................................... 12172437

(51) Int. Cl.

| | | |
|---|---|---|
| *F41H 7/00* | (2006.01) | |
| *F41H 5/06* | (2006.01) | |
| *B64D 11/04* | (2006.01) | |
| *B64D 7/00* | (2006.01) | |
| *B64D 11/00* | (2006.01) | |
| *B64D 45/00* | (2006.01) | |
| *F41H 5/08* | (2006.01) | |
| *F41H 5/14* | (2006.01) | |

(52) U.S. Cl.
CPC .. *F41H 5/06* (2013.01); *B64D 7/00* (2013.01); *B64D 11/0007* (2013.01); *B64D 11/04* (2013.01); *B64D 45/0015* (2013.01); *F41H 5/08* (2013.01); *F41H 5/14* (2013.01)

(58) Field of Classification Search
USPC ................ 89/36.07, 36.09, 36.11, 36.01, 926
See application file for complete search history.

(56) References Cited

U.S. PATENT DOCUMENTS

| | | | |
|---|---|---|---|
| 4,485,491 A | * | 12/1984 | Rasmussen ........................ 2/2.5 |
| 4,781,101 A | | 11/1988 | Zevuluni et al. |
| 5,829,767 A | | 11/1998 | Grossman |
| 8,272,310 B2 | | 9/2012 | Ingram |

(Continued)

FOREIGN PATENT DOCUMENTS

| | | |
|---|---|---|
| CN | 102046042 A | 5/2011 |
| GB | 2024755 A | 1/1980 |
| WO | 2009071867 A1 | 6/2009 |

OTHER PUBLICATIONS

European Patent Office, Extended European Search Report dated Dec. 18, 2012 for European Patent Application No. 12172437.1.

(Continued)

*Primary Examiner* — J. Woodrow Eldred
(74) *Attorney, Agent, or Firm* — Ingrassia Fisher & Lorenz, P.C.

(57) ABSTRACT

In order to provide additional safety measurements for protection on-board a vehicle, a mobile on-board passive protection device for use on-board of a vehicle is provided. The mobile passive protection device comprises side panels and a top and a bottom panel, which panels are enclosing at least one stowage compartment, a plurality of castors for providing movability on-board a vehicle, and a support structure for connecting the castors and the panels. At least one of the side panels is provided with a bullet-protection layer.

17 Claims, 5 Drawing Sheets

(56) References Cited

U.S. PATENT DOCUMENTS

2003/0213359 A1* 11/2003 Kropf ............................ 89/36.09
2004/0000458 A1*  1/2004 Weiss et al. .................. 190/18 A
2005/0133308 A1*  6/2005 Reysa et al. ..................... 186/40
2006/0228201 A1* 10/2006 Lenceski ........................ 414/466

OTHER PUBLICATIONS

State Intellectual Property Office of the People's Republic of China, Office Action in Chinese Patent Application No. 201310240838.3 mailed Mar. 2, 2015.

* cited by examiner

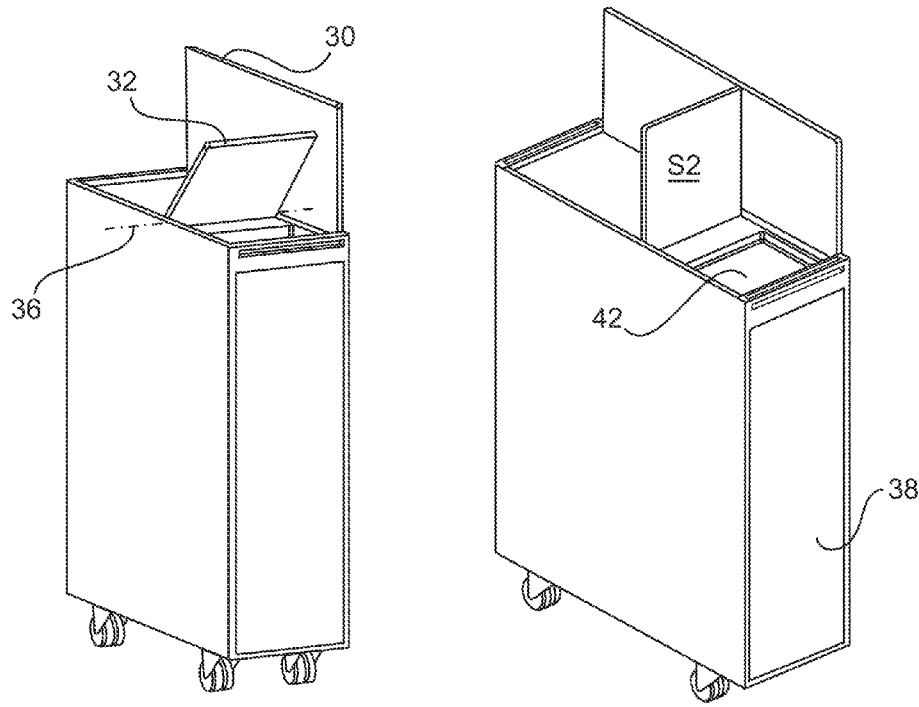
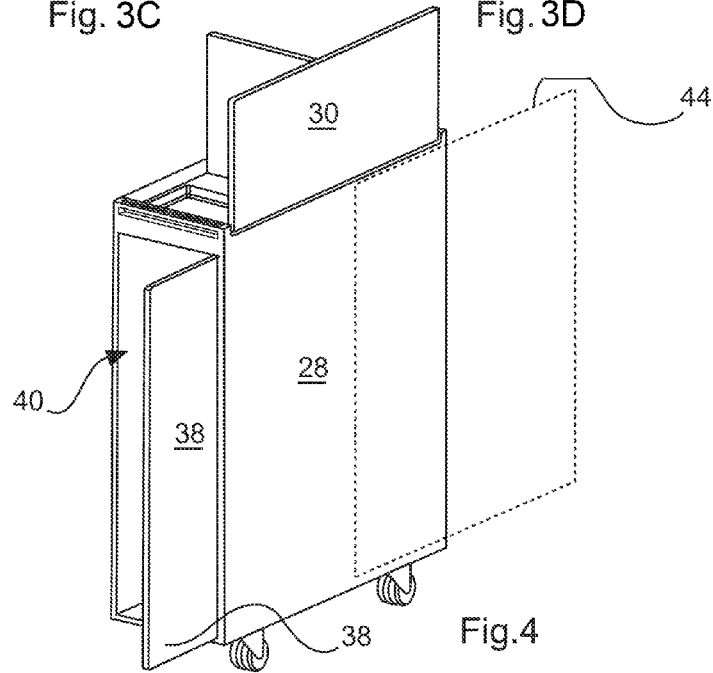

ON-BOARD PASSIVE PROTECTION DEVICE

CROSS-REFERENCE TO RELATED APPLICATIONS

This application claims priority to European Patent Application No. 12 172 437.1, filed Jun. 18, 2012 and to U.S. Provisional Patent Application No. 61/660,952, filed Jun. 18, 2012, which are incorporated herein by reference in their entirety.

TECHNICAL FIELD

The technical field relates to a mobile on-board passive protection device for use on-board of a vehicle, to a passive interior protection system for use on-board of a vehicle, to an aircraft, and to a method for temporarily providing a protected shelter on-board of a vehicle, as well as to a use of a mobile passive protection device in an aircraft, and to a use of a passive interior protection system in an aircraft.

BACKGROUND

Security measurements for protection of passengers and staff members are increasingly required in recent years, in particular for vehicles transporting a larger number of passengers, such as aircrafts, trains, ships, or coaches. For example, in trains, and also in aircrafts, the operating staff members, such as a train driver or the pilots, are separated from the cabin, and thus the passengers, by a lockable door. To provide an improved protection against terrorist attacks, for example, the doors closing off a cockpit have mostly been replaced by bulletproof door constructions in the last ten years. Thus, the pilots are protected against hostile action, resulting from passengers on-board the aircraft inside the cabin space. Similar is known for trains, in particular for high-speed trains. Despite large efforts in security check measurements, ahead of embarking the vehicle, the risk of dangerous and hostile situations on-board the vehicle still exists. For example, in order to provide improved security levels in aircrafts, so-called sky marshals are present during the flight, for example for intervening in an aggressive scenario caused by one or several passengers. However, it has been shown that the presence of sky marshals means economic disadvantages, namely by occupying a valuable seat space, and also by the personnel costs for the sky marshal.

In addition, other objects, desirable features and characteristics will become apparent from the subsequent summary and detailed description, and the appended claims, taken in conjunction with the accompanying drawings and this background.

SUMMARY

Thus, there may be a need to provide additional safety measurements for protection on-board a vehicle.

It should be noted that the following described aspects of the present disclosure apply also for the mobile on-board passive protection device, the passive interior protection system, the aircraft and the method for temporarily providing a protected shelter on-board a vehicle, as well as for the use of a mobile passive protection device in an aircraft and the use of a passive interior protection system in an aircraft.

According to one of various aspects of the present disclosure, a mobile on-board passive protection device for use on-board of a vehicle is provided, comprising side panels and a top and a bottom panel, which panels are enclosing at least one stowage compartment, a plurality of castors for providing movability on-board a vehicle, and a support structure for connecting the castors and the panels. At least one of the side panels is provided with a bullet-protection layer.

The bullet-protection layer may be provided to be bulletproof for commonly used pistols or other hand weapons or handguns. The term "bullet-protection" relates to bulletproof layers, i.e. layers actually stopping commonly used bullet from a hand-fired weapon. The term also relates to providing a barrier function to a bullet such that even in case of a penetration, the bullet is slowed down to an extent where it does not provide any danger any more for, as example only, passengers or staff members behind. The term bullet-resistant may also be used. For example, the bulletproof layer is provided as a Kevlar layer, integrated in the side panel construction. As bullet-protective layer, also woven layers and laminates can be used, as well as ceramic coatings and layers.

For example, the vehicle is an aircraft, e.g. airplane, a train, a coach, or a ship. The mobile protection device provides a mobile protection barrier on-board the vehicle.

The side panel with the bullet-protection layer is a bullet-protection panel. The mobile protection device may have a longitudinal shape, and at least one of the longitudinal side panels is provided as a bullet-protection panel.

In the following, the "mobile on-board passive protection device" is also referred to as "passive protection device".

According to an exemplary embodiment, the mobile passive protection device is a movable unit for use on-board an aircraft for at least one of the group of: stowage, transport, supply, disposal, provision, food preparation, promotion and vending.

For example, the movable unit is an aircraft trolley for use on-board an aircraft for at least one of the group of: stowage, transport, supply, disposal, provision, food preparation, promotion and vending.

The term "movable unit", and thus also the term "trolley", relates to a device that is movable on-board a vehicle by manual movement, but also by motorized movement. The term "movable unit" (and also "trolley") comprises transport carts, e.g. hand carts, wheeled boxes and containers, and transport caddies.

For example, the mobile passive protection device is a movable device used on-board the aircraft for service purposes such as stowing material and equipment, supplying food and beverages to on-board kitchens, supplying service items such as newspapers, towels, cushions and blankets. The transport may be provided between logistic suppliers on an airport or airfield and the aircraft. The transport may also be provided on-board the aircraft between different zones, such as from a storage or cargo department to a service zone such as a kitchen or pantry, also referred to as galleys, and cabin areas, or within different cabin zones or areas.

In an example, the mobile passive protection device is a transport container for cargo-transport on-board an aircraft.

The mobile device is serving one or several on-board functions on the one hand and the protection function on the other hand. In an example, the passive protection device is a multifunctional device.

In an example, the mobile passive protection device is a movable aircraft container for use on-board an aircraft for stowage or transport purposes.

The term "passive" relates to the protection function of the device. The protection is provided as a shielding in a defensive manner without any offensive aspect directed towards a potential source of aggression or danger. In an example, the term "passive" relates to a device that cannot, or at least to only a very limited extent, be taken by a user for attacking purposes, e.g. by an unauthorized person.

According to an exemplary embodiment, the mobile passive protection device is a trolley for inflight service.

The term "inflight service" relates to activities during the flight procedure, where the movable devices are used. An example for inflight service is the beverage and food service in the cabin area during the flight. However, inflight service also comprises activities in the kitchen area by the staff members, for example when preparing the cabin service. A further example for inflight service is the provision of a movable container for providing the above-mentioned newspapers, towels, blankets or other passenger related items. A still further example for inflight service is the provision of a movable container for collecting and storing passengers' on-board luggage or clothing that does not fit into overhead storage compartments.

The term "inflight" relates to the period when the aircraft is actually flying. The term "inflight" also relates to the period when the aircraft is on the ground and passengers are boarding and getting prepared for seating. In such period service may also be provided with the use of movable units, for example trolleys or movable containers. The term "inflight" also relates to the period when the aircraft is on the ground and passengers are de-boarding, i.e. leaving/exiting the aircraft, or are getting ready for doing so.

The trolley may be configured according to the ATLAS standard or the KSSU standard. For example, the trolley is provided for delivering food and beverage service (catering) to passengers during travel of the vehicle. The trolley may also be configured according to foldable trolley constructions. The trolley may also be configured according to the SPICE galley concept with an increased adaptability for easy change or configuration depending on the particular need of the next flight mission.

According to an exemplary embodiment, at least two adjacent side panels are each provided with a bullet protection layer.

According to an exemplary embodiment, all side panels are provided with a bullet-protection layer.

According to an exemplary embodiment, at least one pivotable top panel is provided that is configured as a bullet-protection panel. The top panel can be moved from a first flat state into a second upright state. The top panel is temporarily supported in the upright state.

According to an exemplary embodiment, the top panel is provided to be pivotable around a first pivoting axis parallel to one of its longitudinal sides. For supporting the top panel in the upright state, a secondary top panel is provided that is pivotable around a second pivoting axis arranged perpendicular to the first pivoting axis.

According to an exemplary embodiment, at least one of the end face panels is provided as a pivotable door panel. The pivotable door panel is temporarily supported in a pivoting position perpendicular to the end face.

According to an exemplary embodiment, at least one extractable auxiliary panel is provided in one of the sidewall constructions. The auxiliary panel is provided with a bullet-protection layer. The auxiliary panel is extractable by vertical and/or horizontal sliding movement.

The auxiliary panel can be pulled out, for example, for increasing the protection surface providing shelter area behind. The auxiliary panel can be provided with a temporal support mechanism for holding the auxiliary panel in place, in particular in an upright extracted position.

In another example, a safety stowage compartment is provided, which is hidden by the top panel and the secondary panel.

The mobile passive protection device may be equipped with a panic button. Alternatively, or in addition, a camera for documenting a dangerous situation may be provided.

According to one of various aspects, a passive interior protection system for use on-board of a vehicle is provided, comprising a stowage system with at least one installed cabinet with a plurality of stowage spaces, at least one parking compartment, and at least one mobile on-board passive protection device according to one of the above-mentioned examples. The installed cabinet comprises a number of stowage space enclosing sidewalls. The at least one parking compartment is configured to accommodate the at least one mobile passive protection device. Sidewalls to be facing towards a cabin space in an installed state are provided with a bullet-protection layer.

According to an exemplary embodiment, in a pulled-out state, the mobile passive protection device is temporarily connectable to one of the sidewalls of the cabinet such that a shelter area can be created, which is enclosed with bullet-protection surfaces at least on two sides.

According to an exemplary embodiment, a second installed cabinet with a plurality of stowage spaces is provided. A working zone is provided between the two cabinets. In a pulled-out state, two oppositely arranged mobile passive protection devices are closing off the working zone to a cabin space or aisle space such that a shelter area is provided with bullet-protection on at least three sides.

For example, in the pulled-out state, the mobile passive protection device is temporarily connectable to the respective sidewalls, or edges of these, of both cabinets such that a three-sided shelter area can be created, which is enclosed with bullet-protection surfaces.

For example, the parking compartment may accommodate two mobile devices, such as two trolleys. The passive interior protection system is forming at least a partial partition of an interior space of an aircraft. The passive interior system is, for example, a monument inside the passenger cabin space of an aircraft.

According to an exemplary embodiment, the installed cabinet is part of a galley, wherein at least the lower outer parts of the galley are provided with bullet-protection layers.

According to one aspect, an aircraft is provided, comprising a fuselage structure enclosing at least one cabin space. The cabin space is equipped with at least one mobile passive protection device according to one of the above-mentioned examples, and/or at least one passive interior protection system according to one of the above-mentioned examples.

According to one aspect, a method for temporarily providing a protected shelter on-board a vehicle is provided, comprising the following:

a) providing at least one mobile passive protection device according to one of the above-mentioned examples; and
b) unfolding at least one pivotable side panel such that the protection surface is increased.

According to an aspect, a mobile device, which is used on-board a vehicle anyway, is equipped with protective measurements such as a bullet-protection layer. Thus, an additional security measurement is available on-board an aircraft, for example, which security measurement can be moved and thus provided at the respective location where such measurement is temporarily required. As a result, a flexible additional security measurement for providing protection is at hand. For example, in case of any hostile situation, it is thus possible to provide shelter for at least some passengers or staff members.

By providing additional panels to be unfolded, the respective protecting surface can be increased. In combination with security measurements of interior structures, such as a galley, a protection system is provided for at least partly closing off shelter areas.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIGS. 3A-3D shows another exemplary embodiment of a mobile on-board passive protection device in different unfolding states;

FIG. 4 shows the mobile on-board passive protection device of FIGS. 3A-3D in a second, unfolded state;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
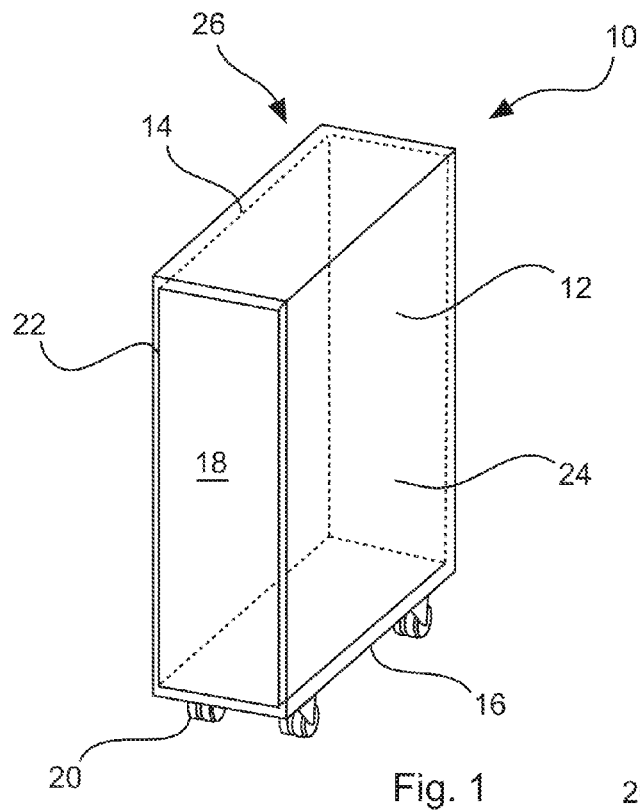
FIG. 1 shows an exemplary embodiment of a mobile on-board passive protection device in a schematic perspective view.

FIG. 1 shows a mobile on-board passive protection device 10 for use on-board of a vehicle. The mobile on-board passive protection device 10 comprises side panels 12, and a top panel 14, as well as a bottom panel 16. The panels are enclosing at least one stowage compartment 18. Further, a plurality of castors 20 for providing movability on-board a vehicle are provided. Further, a support structure 22, also only schematically indicated with dotted lines is provided for connecting the castors and the panels, wherein at least one of the side panels is provided with a bullet-protection layer 24 (not further shown in FIG. 1).

The bullet-protection layer 24 may be provided as a Kevlar layer integrated in the side panel construction. For example, the layer is supported by an outer frame structure, which frame structure may be the support structure 22. The frame structure may be provided to be shock-absorbing when a bullet is fired on the sidewall, or on the plane of the bullet-protection layer 24. Thus, the kinetic energy of the bullet can be transferred to the frame structure where it is absorbed, for example, by specifically provided absorbing elements. For example, the frame structure can be provided such that for absorbing the kinetic energy, the frame structure is undergoing a deformation. Even though this means that the frame structure would have to be displaced, or the complete mobile on-board passive protection device would have to be displaced after acting as a protection measurement, the defined deformation for absorbing bullets, for example, allows an even lighter construction and thinner protective layer, compared with structures where bulletproof characteristics have to be combined with maintaining their functionality, for example in movable doors that still have to function even after a hostile attack in form of bullets or the like.

According to an example, the mobile passive protection device 10 is a trolley 26 for on-board service, for example for inflight service. It must be noted that that besides providing bullet protection, the side panels also provide protection against other attacks, by other weapons, such as knife attacks or others.

In a further example, not shown in detail, the mobile passive protection device is a movable unit, e.g. an aircraft trolley, for use on-board an aircraft for at least one of the group of: stowage, transport, supply, disposal, provision, food preparation, promotion and vending.

In a further example, also not shown in detail, the mobile passive protection device is a transport container for cargo-transport on-board an aircraft.

Figure 2:
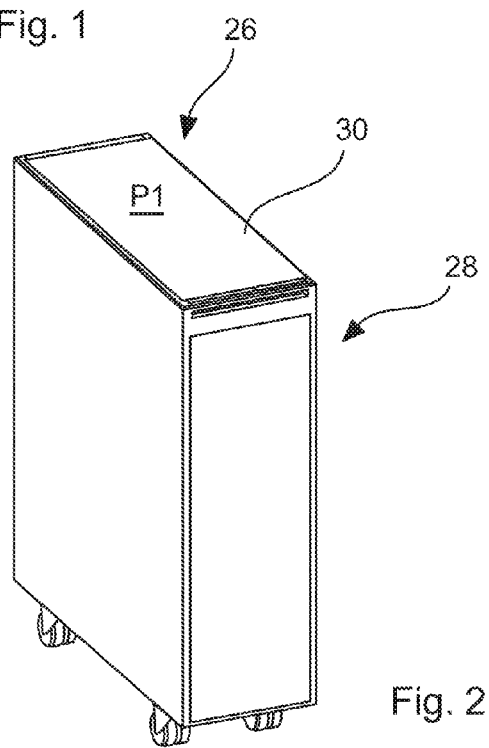
FIG. 2 shows another embodiment of a mobile on-board passive protection device in a first state.

FIG. 2 shows a perspective view of a trolley 26, wherein at least the rear side (relating to the drawing) facing to the right, indicated with reference numeral 28, is provided as a bullet-protection layer. The other sides may be equipped similar.

Figure 3A:
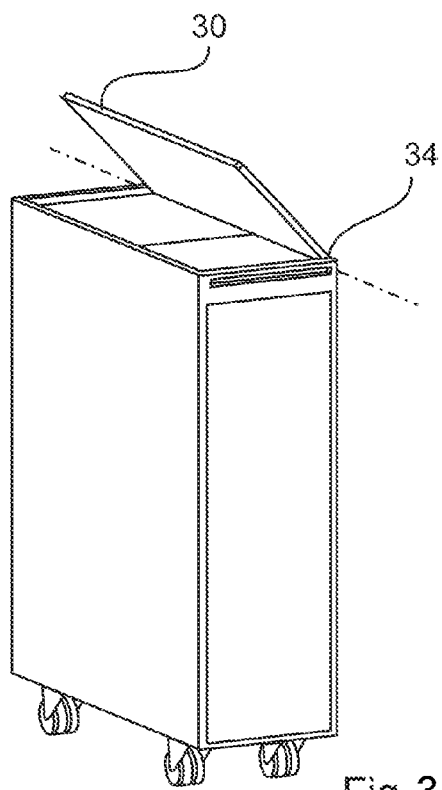
Figure 3B:
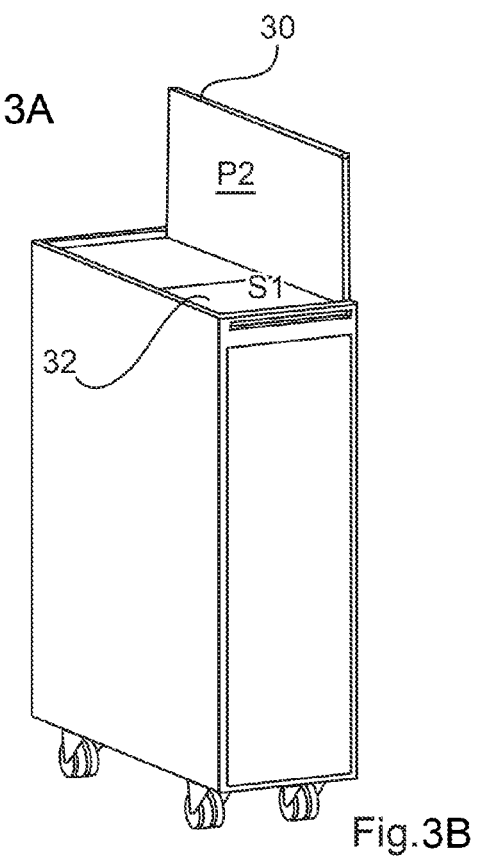

Further, a pivotable top panel 30 may be provided, as shown in FIG. 3A in a partly folded-up state. The top panel 30 can be moved from a first flat state P1, as shown in FIG. 2, into a second upright state P2, as shown in FIG. 3B. The top panel is temporarily supported in the upright state. For example, a secondary top panel 32 is provided, as shown in FIG. 3C. As shown, the top panel 30 is provided to be pivotable around a first pivoting axis 34 parallel to one of its longitudinal sides. The secondary top panel 32 is pivotable around a second pivoting axis 36 arranged perpendicular to the first pivoting axis 34. As shown in FIG. 3C, the secondary top panel 32 can be moved from a first flat state S1 to a second upright state S2, shown in FIG. 3D.

Further, at least one of the end face panels is provided as a pivotable door panel 38, as shown in FIG. 4, for further increasing the bullet-protection surface. For example, the pivotable door panel 38 is temporarily supported in a pivoting position 40, perpendicular to the end face, or parallel to the side faces, whereas FIG. 3D shows the closed state of the door panel 38.

As can be seen in FIG. 4, it is not only the side panel 28 that provides bullet-protection, but also the pivotable top panel 30 in combination with the door panel 38.

A further feature is also indicated in combination with the folding mechanisms in FIGS. 3A to 3D. For example, a stowage compartment 42 is provided, which is hidden by the top panel and the secondary panel 32, and which is only accessible in case of a complete folded-up state of the two panels.

According to a further example, an extractable auxiliary panel 44 is provided in one of the sidewall constructions, as indicated with dotted lines in FIG. 4. The auxiliary panel 44 is provided with a bullet-protection layer and is extractable, for example, by horizontal sliding movement. In another example, not shown, the auxiliary panel 44 can be extracted by a vertical sliding movement. For example, lift supporting mechanisms can be provided, for example spring or tension elements or hydraulic cylinders, for facilitating the upright directed extension movement. Thus, the bullet-protection surface area, and thus shielding size, can be further increased.

Figure 5:
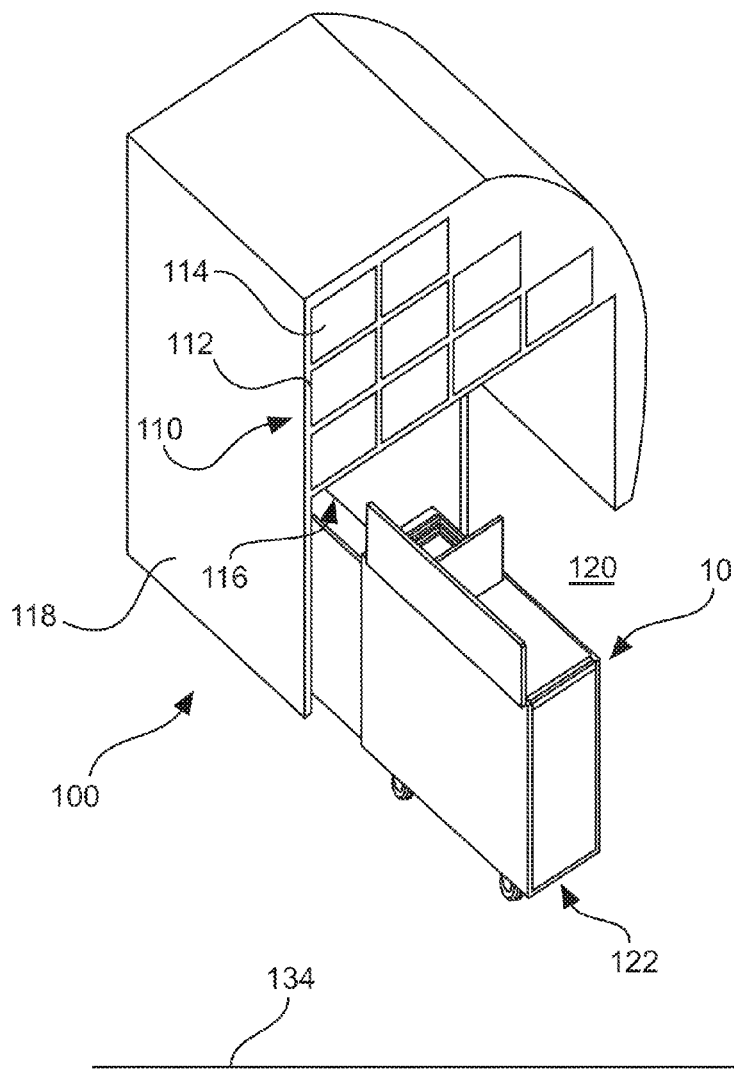
FIG. 5 shows an exemplary embodiment of a passive interior protection system in a perspective view.

FIG. 5 shows a passive interior protection system 100 for use on-board of a vehicle, for example on-board of an aircraft. The passive interior protection system 100 comprises a stowage system 110 with at least one installed cabinet 112 with a plurality of stowage spaces 114. Further, at least one parking compartment 116 is provided. Still further, at least one mobile on-board passive protection device 10 according to one of the above-mentioned examples is provided. The installed cabinet 112 comprises a number of stowage space enclosing sidewalls 118. The at least one parking compartment 116 is configured to accommodate the at least one mobile passive protection device 10. Sidewalls to be facing towards a cabin space in an installed state, for example the sidewall 118, are provided with a bullet-protection layer.

Thus, by pulling out the passive protection device 10, e.g. the bulletproof trolley, it is possible to find shelter in a shelter area 120 behind the bullet-protection surfaces.

According to a further example (not further shown), in a pulled-out state, shown in FIG. 5, indicated with reference numeral 122, the mobile passive protection device 10 is temporarily connectable to one of the sidewalls of the cabinet 112 such that the shelter area 120 is created, which is enclosed with bullet-protection surfaces at least on two sides. For example, the temporal connection is provided by engaging end profiles that engage each other automatically when the door is opened and the trolley is pulled out. For example, for the self-finding engagement, two oppositely arranged U-shaped profiles are arranged. Thus, it is only necessary to pull out the trolley to a full extent, while the door is opened and temporarily attached to the cabinet for providing a continuous shelter surface. The door can be urged or biased against the side wall when a respective door opening mechanism has been activated.

Figure 6:
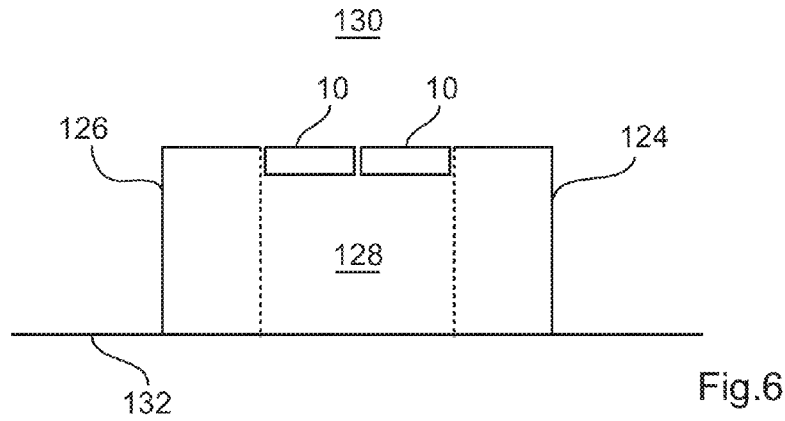
FIG. 6 shows another exemplary embodiment of a passive interior protection system in a top or plan view.

As shown in FIG. 6, in another example, a first installed cabinet 124 and a second installed cabinet 126 are provided with a plurality of stowage spaces. A working zone 128 is provided between the two cabinets. In a pulled-out state, two oppositely arranged mobile passive protection devices 10 are closing off the working zone to a cabin space or isle space 130 such that a shelter area is provided with bullet-protection on at least three sides. As shown in FIG. 6 in a plan view, the distance of the two oppositely arranged installed cabinets may be configured such that the two mobile passive protection devices are closing off the working zone for the cabin space or aisle space without the necessity to open the doors. In another example, the two cabinets are displaced to each other with a larger distance, such that the doors of the passive protection trolleys have to be opened for closing off the working zone to the aisle space. In FIG. 6, a first line 132 schematically indicates a first sidewall of an aircraft fuselage, and a second line 134 indicates the opposite fuselage structure with the cabin sidewall.

Figure 7:
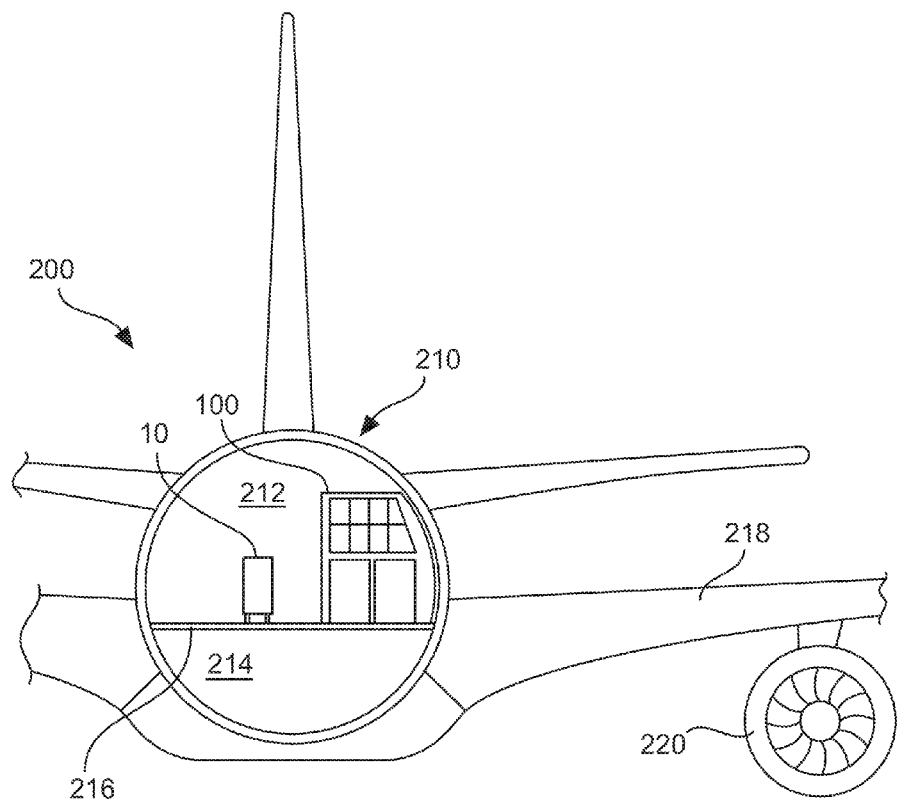
FIG. 7 shows an embodiment of an aircraft with a mobile passive protection device and/or a passive interior protection system.

FIG. 7 shows an aircraft 200 in a cross-section, comprising a fuselage structure 210 enclosing at least one cabin space 212. Further, a stowage space 214 is shown beneath a floor construction 216. Still further, a wing structure 218 is shown, equipped, for example, with an aircraft engine 220.

The cabin space 212 is equipped, for example, with at least one of the mobile passive protection devices 10 described above in different examples. In another example, also shown in FIG. 7, the cabin space 212 is equipped with at least one passive interior protection system 100, as described above in different examples. It must be noted that it is also possible to equip the cabin space with only the mobile passive protection device 10.

Thus, additional security measurements are provided for additional safety of passengers or staff members.

In another example, a train or ship is provided that is equipped with a mobile protection device as described above. The train or ship may also be equipped with a passive interior protection system as described above.

Figure 8:
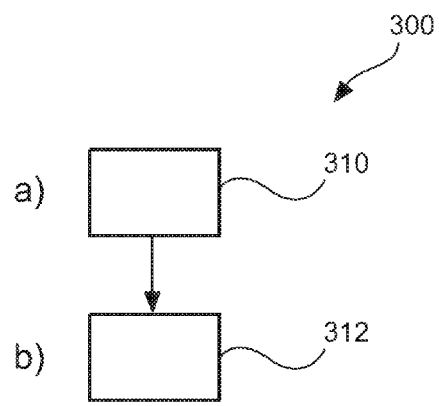
FIG. 8 shows a method according to an exemplary embodiment.

FIG. 8 shows a method 300 for temporarily providing a protected shelter on-board of a vehicle. In 310, at least one mobile passive protection device according to one of the above-mentioned examples is provided, and in 312, at least one pivotable side panel is unfolded such that the protection surface is increased. Block 310 is also referred to as a), and block 312 as b).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A mobile on-board passive protection device for use on-board of a vehicle, comprising:
   a plurality of side panels coupled to a top panel and a bottom panel, the plurality of side panels, top panel and bottom panel enclosing at least one stowage compartment;
   a plurality of castors for providing movability on-board a vehicle; and
   a support structure for connecting the castors to one or more of the plurality of side panels or bottom panel,
   wherein at least one of the plurality of side panels is provided with a bullet-protection layer,
   wherein at least one pivotable top panel is provided that is configured as a bullet-protection panel and the top panel is movable from a first flat state into a second upright state and the top panel is supported in the second upright state, and
   wherein the top panel is provided to be pivotable around a first pivoting axis parallel to one of its longitudinal sides and, for supporting the top panel in the second upright state, a secondary top panel is provided that is pivotable around a second pivoting axis arranged perpendicular to the first pivoting axis.

2. The passive protection device according to claim 1, wherein the mobile passive protection device is a trolley for movement through an aircraft aisle to provide inflight service.

3. The passive protection device according to claim 1, wherein at least two adjacent side panels of the plurality of side panels are each provided with a bullet-protection layer.

4. The passive protection device according to claim 1, wherein all of the plurality of side panels are provided with a bullet-protection layer.

5. The passive protection device according to claim 1, wherein at least one of the end face panels is provided as a pivotable door panel; and the pivotable door panel is supported in a pivoting position perpendicular to the end face.

6. The passive protection device according to claim 1, wherein at least one extractable auxiliary panel is provided in one of the sidewall constructions, the auxiliary panel provided with a bullet-protection layer, and the auxiliary panel is extractable by at least one of a vertical and a horizontal sliding movement.

7. A passive interior protection system for use on-board of a vehicle, comprising:
a stowage system that includes:
at least one parking component;
at least one installed cabinet with a plurality of stowage spaces that are enclosed by sidewalls of the at least one parking component; and
at least one mobile on-board passive protection device that includes a plurality of side panels coupled to a top panel and a bottom panel, the plurality of side panels, top panel and bottom panel enclosing at least one stowage compartment and at least one of the plurality of side panels provided with a bullet-protection layer;
wherein the at least one parking compartment accommodates the at least one mobile passive protection device; and
wherein sidewalls to be facing towards a cabin space are provided with a bullet-protection layer;
wherein the mobile passive protection device is a trolley for inflight service;
wherein at least one pivotable top panel is provided that is configured as a bullet-protection panel and the top panel is movable from a first flat state into a second upright state and the top panel is supported in the second upright state; and
wherein the top panel is provided to be pivotable around a first pivoting axis parallel to one of its longitudinal sides and, for supporting the top panel in the second upright state, a secondary top panel is provided that is pivotable around a second pivoting axis arranged perpendicular to the first pivoting axis.

8. The passive interior protection system according to claim 7, wherein in a pulled-out state, the mobile passive protection device is temporarily connectable to one of the sidewalls of the cabinet such that a shelter area is created, which is enclosed with bullet-protection surfaces at least on two sides.

9. The passive interior protection system according to claim 7, wherein a second installed cabinet with a plurality of stowage spaces is provided, with a working zone provided between the two cabinets, and in a pulled-out state from the parking compartment, two oppositely arranged mobile passive protection devices are such that a shelter area is provided with bullet-protection on at least three sides.

10. The passive interior protection system according to claim 7, wherein the installed cabinet is part of a galley, and at least the lower outer parts of the galley are provided with bullet-protection layers.

11. A method for temporarily providing a protected shelter on-board a vehicle, comprising:
providing at least one mobile passive protection device that includes a plurality of side panels coupled to a top panel and a bottom panel, the plurality of side panels, top panel and bottom panel enclosing at least one stowage compartment, with at least one of the plurality of side panels provided with a bullet-protection layer and at least one of the side panels pivotable relative to the remainder of the plurality of side panels; and
unfolding the at least one pivotable side panel such that the protection surface is increased,
wherein the mobile passive protection device is a trolley for inflight service;
wherein at least one pivotable top panel is provided that is configured as a bullet-protection panel and the top panel is movable from a first flat state into a second upright state and the top panel is supported in the second upright state; and
wherein the top panel is provided to be pivotable around a first pivoting axis parallel to one of its longitudinal sides and, for supporting the top panel in the second upright state, a secondary top panel is provided that is pivotable around a second pivoting axis arranged perpendicular to the first pivoting axis.

12. The passive protection device according to claim 1, wherein the mobile passive protection device is a movable unit for use on-board an aircraft for at least one of stowage, transport, supply, disposal, provision, food preparation, promotion and vending.

13. The passive interior protection system according to claim 7, wherein the mobile passive protection device is a trolley for movement through an aircraft aisle to provide inflight service.

14. The passive interior protection system according to claim 7, wherein at least two adjacent side panels of the plurality of side panels are each provided with a bullet-protection layer.

15. The passive interior protection system according to claim 7, wherein all of the plurality of side panels are provided with a bullet-protection layer.

16. The passive interior protection device according claim 7, wherein at least one pivotable top panel is provided that is configured as a bullet-protection panel and the top panel is movable from a first flat state into a second upright state and the top panel is temporarily supported in the second upright state.

17. The passive interior protection system according to claim 7,
wherein the vehicle is an aircraft.

* * * * *